United States Patent
Clapper

Patent Number: 6,154,531
Date of Patent: Nov. 28, 2000

[54] TELEPHONE CALLER IDENTIFICATION SYSTEM

[75] Inventor: Edward O. Clapper, Tempe, Ariz.

[73] Assignee: Intel Corporation, Santa Clara, Calif.

[21] Appl. No.: 09/191,765

[22] Filed: Nov. 13, 1998

[51] Int. Cl.[7] .............................. H04M 1/56; H04M 15/06
[52] U.S. Cl. .................. 379/142; 379/80.21; 379/93.23; 379/102.03
[58] Field of Search ............................... 379/88.19, 88.2, 379/88.21, 93.23, 120, 127, 142, 354, 102.03

[56] References Cited

U.S. PATENT DOCUMENTS

| | | | |
|---|---|---|---|
| 5,574,779 | 11/1996 | Ely et al. ................................. | 379/207 |
| 5,592,546 | 1/1997 | Takahashi ................................ | 379/355 |
| 5,805,677 | 9/1998 | Ferry et al. ............................. | 379/93.35 |
| 5,875,239 | 2/1999 | Koralewski et al. ..................... | 379/142 |
| 5,883,942 | 3/1999 | Lim et al. ................................ | 379/142 |
| 5,987,106 | 11/1999 | Kitamura ............................. | 379/110.01 |

*Primary Examiner*—Duc Nguyen
*Attorney, Agent, or Firm*—Trop, Pruner & Hu, P.C.

[57] ABSTRACT

Telephone caller identification information may be selectively displayed visually or audibly. The user may also be afforded the opportunity to select the video and audio formats for the caller identity notifications.

15 Claims, 5 Drawing Sheets

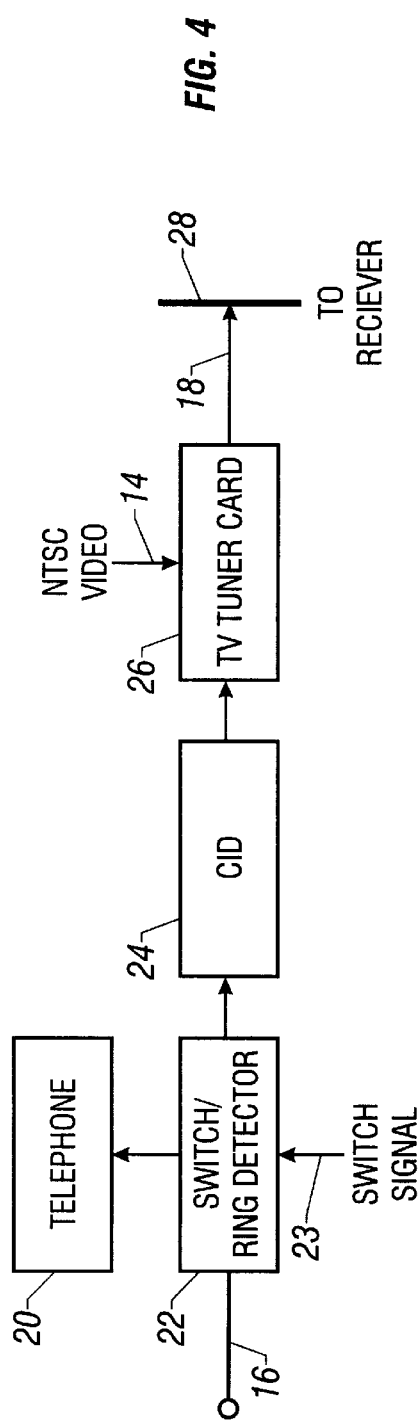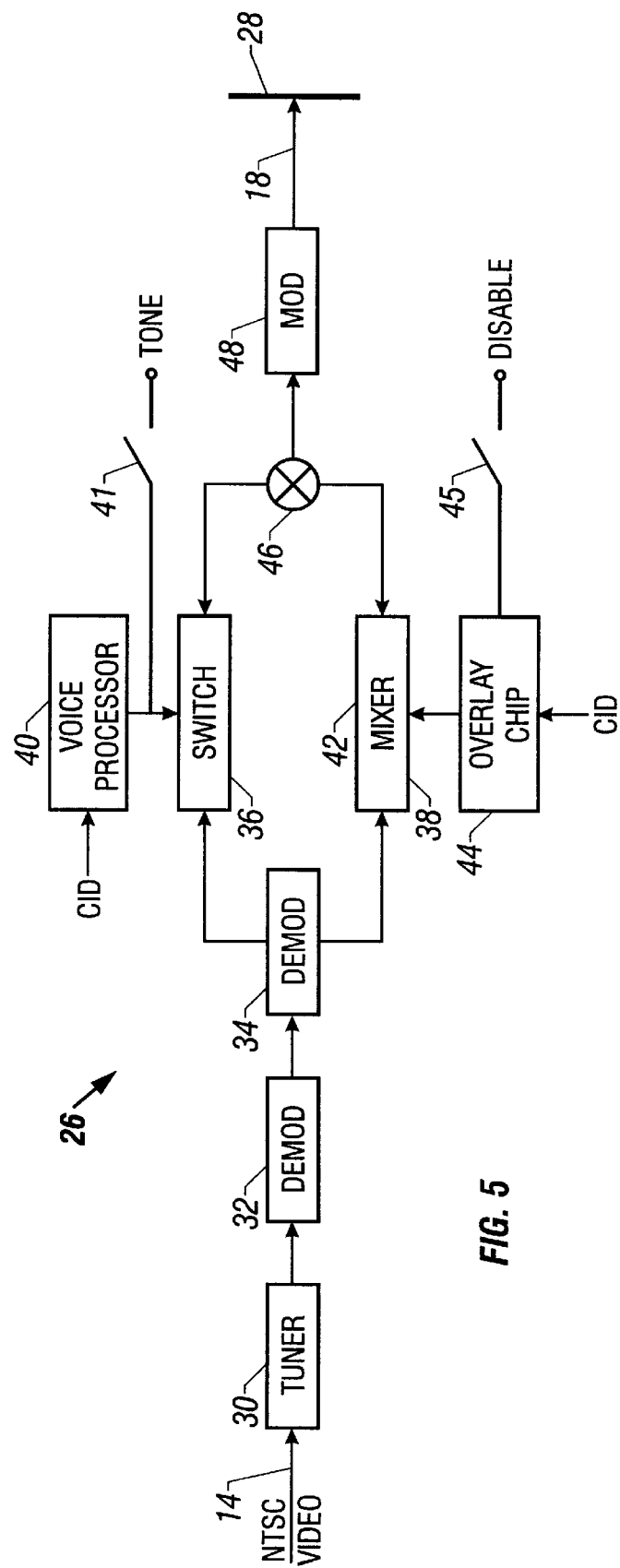

6,154,531

TELEPHONE CALLER IDENTIFICATION SYSTEM

BACKGROUND

This invention relates generally to telephone caller identification methods and apparatus.

Many telephone systems offer caller identification services. Caller identification service or caller identity delivery (CID) involves a signal transmitted over a conventional telephone line which identifies the originator of the telephone call to the receiver of the telephone call. To decode the caller information, the receiver may include equipment which is capable of decoding the calling identity delivery information provided over the telephone line.

With caller identity delivery systems, the telephone user can determine who is calling and decide whether or not to answer the call. If the call not answered, it may be picked up by a telephone answering system. By identifying the caller, the user can determine whether he or she desires to answer the phone; however, with caller identity delivery systems, the user usually must go to the telephone in order to determine the identity of the caller. This means that the user has to interrupt his or her ongoing activities to determine whether to answer the call. In some cases it may be just as easy to answer the call as to attempt to determine the caller's identity.

For example, when the user is working on his or her computer system or is watching television, the interruption to travel to the location of the telephone to receive the caller identity delivery information, to some degree, subverts the value of a caller identity delivery system.

Thus, there is a continuing need for better ways to advise telephone users of the identity of a calling party.

SUMMARY

In accordance with one embodiment, a caller identification system may include a receiver that receives a telephone caller identity delivery signal containing caller identification information. A first converter is adapted to generate a video signal containing the caller identification information. A second converter is adapted to generate an audio signal containing the caller identification information. A switch is adapted to select at least one of the first or second converters to output a signal containing the caller identification information.

BRIEF DESCRIPTION OF THE DRAWINGS

FIG. 4 is a block depiction of still another embodiment in accordance with the invention;

FIG. 5 is a more detailed block depiction of a TV tuner card in accordance with one embodiment of the invention;

DETAILED DESCRIPTION

Figure 1:
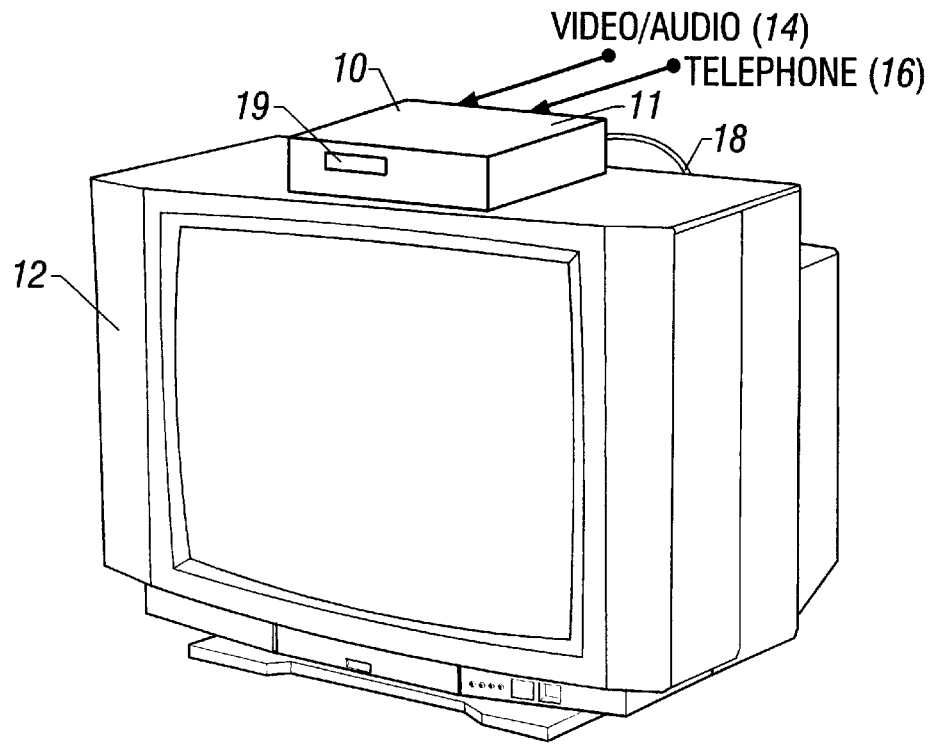
FIG. 1 is a perspective view of one embodiment in accordance with the invention.

A telephone caller identification system 10, shown in FIG. 1, may include a caller identity delivery (CID) receiver 11 and an audio-visual receiver 12. In one embodiment, the receiver 12 may be a television receiver but in other embodiments, it may be a monitor for a computer system or a stereo system, for example. The CID receiver 11 receives a video/audio signal through a video/audio port 14 and a telephone signal through the telephone port 16. The telephone port 16 may be coupled to receive telephone signals over telephone lines or over a wireless connection, e.g., cellular connection. The CID receiver 11 may also include a display 19 which in one embodiment may be a liquid crystal display.

A coupling 18 may couple the receiver 10 to the audio-visual device 12 to enable the receiver 11 to control the output of video and audio information on the receiver 12. The coupling 18 may be a wire or a wireless connection.

Figure 2:
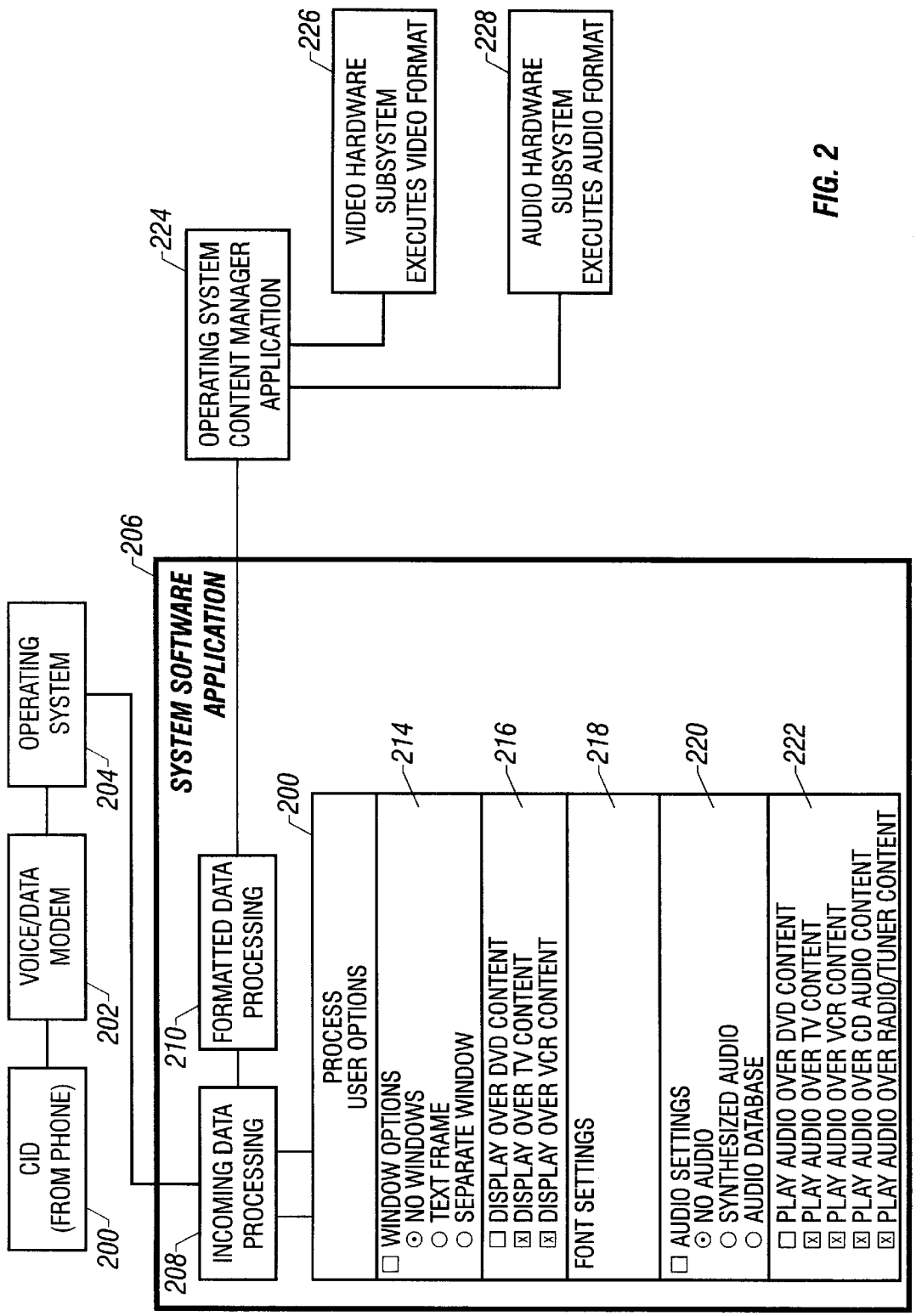
FIG. 2 is a block depiction of software for implementing one embodiment of the invention.

In accordance with one embodiment of the invention, the receiver 11 enables the audio-video receiver 12 to selectively display the CID information as a video display or through an audio notification. In one embodiment of the invention, caller identification information may be selectively displayed in a variety of user selectable formats either in video or audio as shown in FIG. 2. The CID information from a telephone line is received at block 200. The information is transmitted to a voice/data modem 202. The modem 202 communicates with an operating system 204 which passes the CID information to a system software application 206.

The application 206 processes the incoming data at 208 and allows a user to select a plurality of options or settings as illustrated in block 212. These options may be presented to the user in a variety of formats including graphical user interfaces during a setup sequence. The user's options may include whether to display information visually over the ongoing video on a television receiver or other video display as indicated in block 214. In block 214, in one illustrated embodiment, three different window options may be provided, including no window which would correspond to audio rather than video display of CID information. A text frame may be selected which may be overlaid over the existing video displayed for example, on a television receiver or monitor. Also a separate window may be selected which may provide a picture within picture (PIP)type display. One PIP window displays the ongoing video information and the other PIP window displays the CID information, including for example, the telephone number and/or identity of the caller.

Next in block 216, the user who has selected video display can program whether or not the display will be displayed over video information from various video handling devices. For example, the user may select to display over television information from a video cassette recorder (VCR) as indicated in the illustrated embodiment, but not over digital video disk (DVD) content. The user may, for example, wish not to have DVD movies interrupted with CID information but may not mind having television or VCR content so interrupted.

Next, the user can select the font displays for the various video CID information. The user may select a drop down menu for color and font styles by clicking on a graphic user interface as indicated in block 218.

If the user instead prefers to have the CID information presented as audio, the user may select one of the audio settings set forth in block 220 other than the "no audio"

selection. For example, the user may select synthesized audio in which the CID information is transformed into a voice announcement of CID information using voice synthesis. Also the user may select an audio database where the audio is presented using a variety of user selectable sounds. As in block 216, with the audio CID presentation, the user can select whether the audio CID information is presented over the audio from various audio input devices including DVD, TV, VCR, compact disk (CD) or a radio/tuner content as indicated in block 222.

Once the user has made his or her selections, the selections are formatted into data instructions in block 210 and transmitted to an operating system content manager application 224. The content manager may be one of a variety of well known content manager application software packages. The content manager application 224 then communicates with the video hardware subsystem 226 to execute the desired video format as indicated in block 226 and with the audio hardware subsystem 228 to execute the selected audio format.

Figure 3:
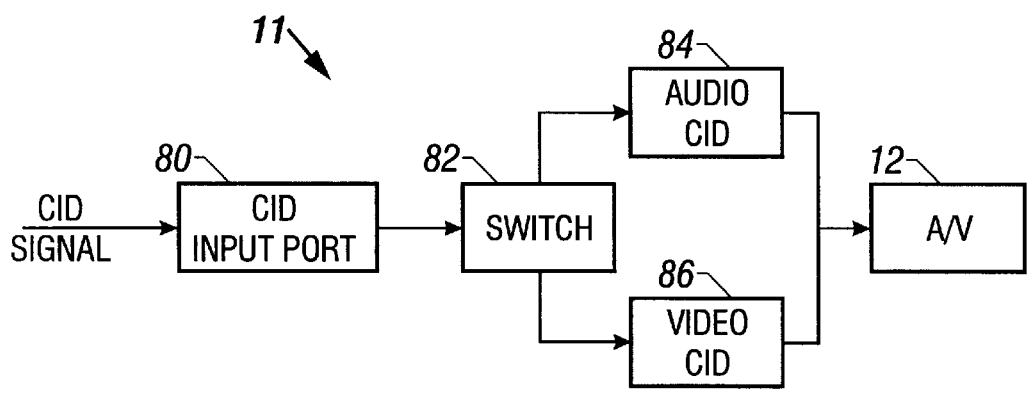
FIG. 3 is a block depiction of a system to allow the user to select either audio or video output of caller identity delivery information in accordance with one embodiment of the invention.

In another embodiment of the invention, the receiver 11 may include a CID input port 80 which is coupled to a switch 82, as shown in FIG. 3. The input port 80 receives the CID signal through the telephone port 16. The CID input port 80 may decode the CID signal and in some embodiments of the invention, may produce an off hook telephone signal to prevent additional incoming calls.

The switch 82 may control whether the audio-visual receiver 12 is driven to produce an audio output signal or a video output signal, or both, identifying the incoming caller. The switch 82 may be programmed to produce either of the output signals, as desired and predetermined by the user of the system 10.

The switch 82, in one embodiment of the invention, may selectively disable the audio converter 84 or the video converter 86 to control whether the CID information is displayed visually or audibly. In another embodiment, the switch 82 may control the outputs of the converters 84 and 86 to control whether the CID information is displayed audibly or visually. In this way, the user can select, using either software or hardware in the switch 82, whether the CID information is displayed on an audio-visual receiver 12 either visually or audibly, for example. Of course, the receiver 12 may be a video receiver, such as a television, which also has audio capabilities. The receiver 12 may also be purely a video display such as a liquid crystal display or a monitor associated with a computer system. Similarly, the receiver 12 may be a stereo system having only audio capabilities. Other receivers may be used as well.

According to FIG. 4, another embodiment of the receiver 11 in accordance with the invention, includes a switch/ring detector 22 which is connected to the telephone port 16. The ring detector 22 may switch an incoming telephone call to the telephone 20 or to a caller identity delivery (CID) decoder 24. The detector 22 may detect a ring signal through the telephone port 16 and activate the CID decoder 24 to monitor the CID information. The CID detection may occur, in one embodiment, between the first and second ring signals, prior to the onset of the actual telephone communication. The switch/ring detector 22 may be controlled by a switching signal 23 to determine whether the CID decoder 24 (and thus the CID notification feature)is disabled so that the incoming call may be handled, for example by the telephone 20 or a telephone answering device (not shown).

If the CID information is switched to the decoder 24, the decoder 24 may produce a decoded caller identification signal to a television tuner card 26, in one embodiment in accordance with the invention. The television tuner card 26 may be associated with a processor or microcontroller-based system, such as a computer system. The card 26, in one embodiment, receives a video composite signal through the port 14, which may be a National Television System Committee (NTSC) composite video signal, a European phase alternate line (PAL), Sequential Couleur Avec Memoire (SECAM) composite video signal, or an Advanced Television System Committee (ATSC) composite video signal as additional examples. The tuner card 26 may decode the incoming signal and provide it to a bus 28 in the receiver 11 through the coupling 18.

The card 26 may include a tuner 30 in one embodiment in accordance with the invention, as illustrated in FIG. 5. While one embodiment is illustrated, it should be understood that the present invention is not limited to the illustrated embodiment. The tuner 30 may produce a audio-video signal which is demodulated by the demodulator 32. The demodulator 32 essentially removes the carrier wave from the composite video signal and passes the resulting signal to a filter 34 which separates the audio and video components.

The filtered audio component passes through a switch 36 which may, for example, be part of the switch 82 described previously. The switch 36 may receive input audio information from an audio device 40. The audio device 40 may be a voice processor coupled to a database to produce a spoken notification of the telephone number and/or name of the party identified by the CID information. The audio information may be provided to a mixer 46 that may mix audio and video information and pass the mixed information to a modulator 48. The modulator 48 may generate a video signal, similar to the input composite video signal, that may be passed through the coupling 18 to the bus 28.

The filter 34 may also feed a video signal to the mixer 42 in one embodiment. The mixer 42 may receive an overlay video signal from the overlay character generator 44. In other words, the CID signal may be transformed into a video overlay signal by the overlay character generator 44. As a result, the CID information may be visually overlaid over the incoming video signal. The combined (incoming plus overlay) signal may then be mixed with the audio signal, if any, and passed to the modulator 47.

Thus, the audio-visual receiver 12 may receive a signal that may have been modified to provide either an audio or a video indication of the CID information. Depending on whether the user has selected an audio or video notification, the audio-video receiver 12 may provide audible or visible notification of either the number or the identity of the calling party. Of course, the user can also select to disable the CID notification.

Figure 6:
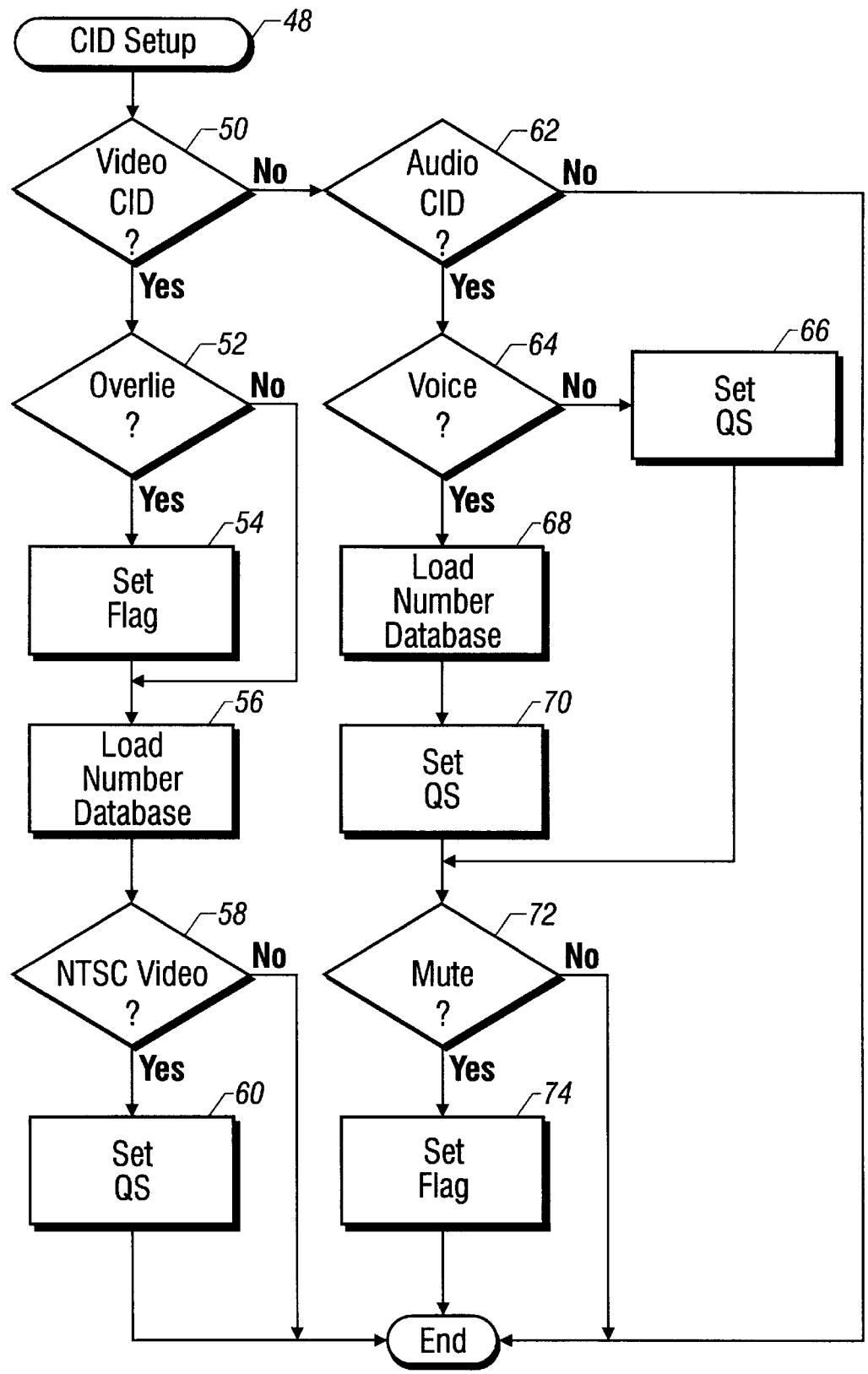
FIG. 6 is a flow chart showing one embodiment for allowing the user to select the features desired for a caller identification system in accordance with the invention.

Turning now to FIG. 6, the user may input the desired CID functionality using the software in accordance with one embodiment of the invention. Initially, a check at diamond 50 determines whether the user wishes to select a video CID notification. If so, the user is next queried, at diamond 52, whether the user wishes to have an overlay display of the CID information. If so, a flag is set at block 54. If the overlay is not selected, the user automatically defaults to a window or message box style display.

Next, a number database may be loaded at block 56 with information that correlates telephone numbers with the names of frequent callers. This enables the video display to display the caller's name rather than merely a telephone number. Next, the user may be prompted at block 58 to select one of two video formats. For example, the user may select either an NTSC video display or alternatively, an ASCII display associated with the computer format video. If the user selects the NTSC video, a switch 45 (FIG. 4) is set, as indicated at block 60. This switch 45 may disable the overlay character generator 44 in the embodiment illustrated in FIG. 5. If ASCII video is selected, the software may be set to produce the video through the display controller.

Each of the determinations in diamonds 50, 52 and 58 may be prompted by on screen displays involving graphical user interfaces. The user may be asked to respond with a simple yes or no, for example, as to the nature of the CID video notification that the user desires. The information may then be stored in association with the software to provide the desired video format CID notification until otherwise altered.

If the user opts against the video CID display, the user is queried to indicate whether the user desires an audio CID notification as indicated in diamond 62. If so, the user is queried to indicate whether the user desires a synthesized voice indication, as indicated in diamond 64. If so, a number database may be loaded at block 68 so that the voice synthesizer can produce a spoken user's name instead of simply the numbers associated with the identified calling telephone. A switch is set as indicated at block 70 to implement the voice identification. Otherwise, at block 66, a switch 41 (FIG. 5) may be set to provide a tone or other indication that a call has come in.

The user then may indicate whether the user desires to mute the audio on the audio-visual receiver 12 when incoming CID information has been recognized. If so, the appropriate flag is set, as indicated in block 74. Otherwise, no such flag is set, and the audio is simply reduced in volume in response to an incoming telephone call containing CID information. Alternatively, the user can set a default which simply provides no muting or no reduction of audio volume for the receiver 12.

Figure 7:
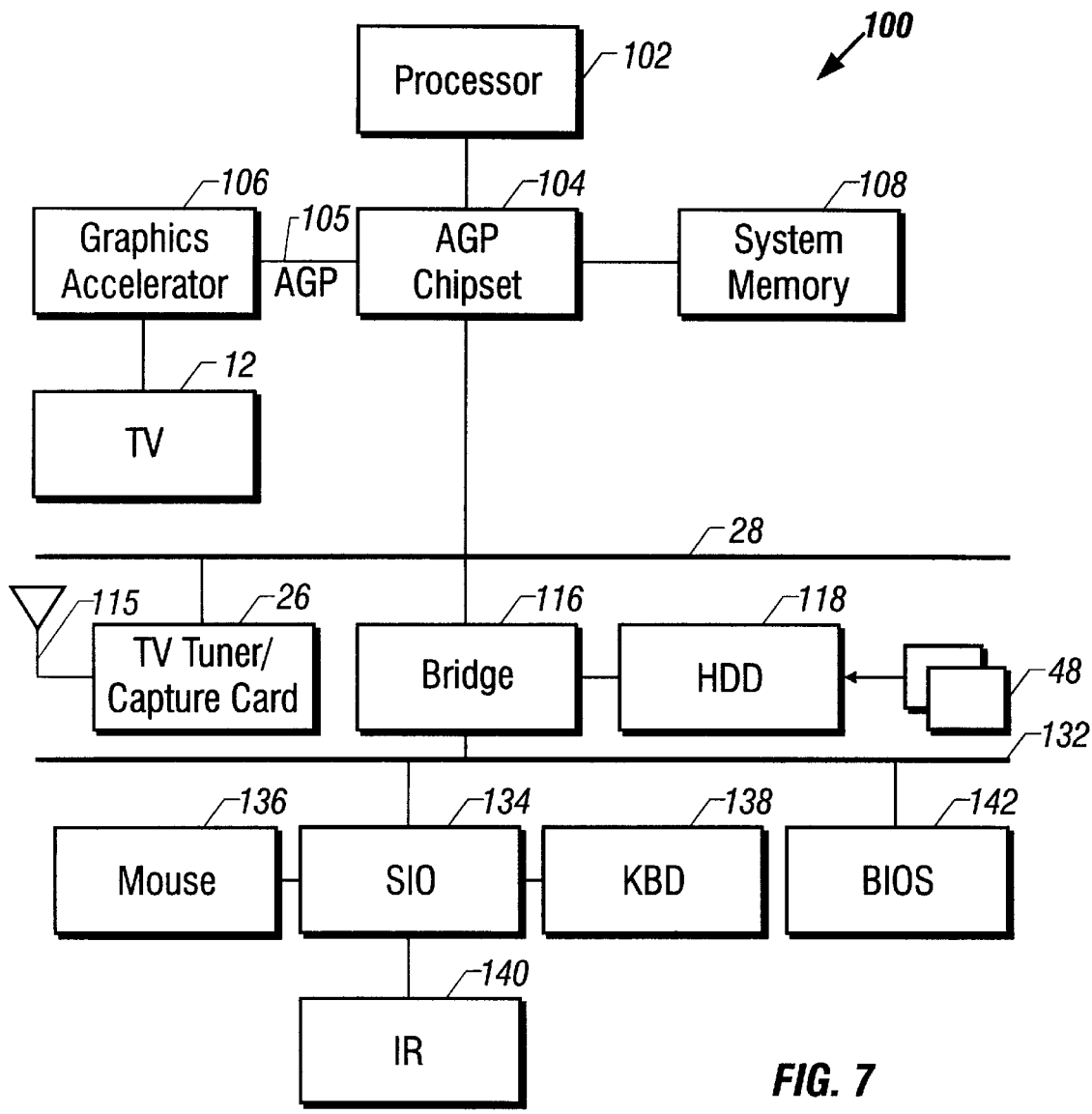
FIG. 7 is a block diagram of a computer system that may be utilized to implement one embodiment of the invention.

A computer system 100 in accordance with one embodiment of the invention, shown in FIG. 7, includes a processor 102. In one embodiment, the processor may be coupled to an accelerated graphics port (AGP) (See Accelerated Graphics Port Interface Specification, Revision 1.0, published on Jul. 31, 1996 by Intel Corporation, Santa Clara, Calif.) chipset 104 for implementing an accelerated graphics port embodiment. The chipset 104 communicates with the AGP port 105 and the graphics accelerator 106. The television 12 may be coupled to the video output of the graphics accelerator 106. The chipset 104 accommodates the system memory 108. The chipset 104 is also coupled to a bus 28. The bus 28 couples a TV tuner/capture card 26 which is coupled to an antenna 115 or other video input port, such as a cable input port, a satellite receiver/antenna or the like. The TV tuner and capture card 26 selects a desired television channel and also performs the video capture function. One exemplary video capture card is the ISVR-III video capture card available from Intel Corporation.

The bus 112 is also coupled to a bridge 116 which couples a hard disk drive 118. The software 48 may be stored on the hard disk 118. The bridge 116 is also coupled to another bus 132. The bus 132 may be coupled to a serial input/output (SIO) device 134. The device 134 is in turn coupled to conventional components such as a mouse 136, a keyboard 138, and an infrared interface 140. Also connected to the bus 132 is a basic input/output system (BIOS) 142.

While the present invention has been described with respect to a limited number of embodiments, those skilled in the art will appreciate numerous modifications and variations therefrom. It is intended that the appended claims cover all such modifications and variations which fall within the true spirit and scope of the present invention.

What is claimed is:

1. A caller identification system comprising:
   a receiver that receives a telephone call identification signal containing caller identification information;
   a first converter to generate a video signal containing said caller identification information;
   a second converter to generate an audio signal containing said caller identification information;
   a switch to select at least one of said first and second converters to output a signal containing said caller identification information; and
   a graphical user interface that allows a user to select between the first and second converters.

2. The system of claim 1 wherein said receiver is a computer system.

3. The system of claim 2 wherein said computer system is a set top computer system.

4. The system of claim 1 wherein said first converter is adapted to generate a NTSC video signal.

5. The system of claim 1 wherein said first converter is adapted to produce an ASCII video signal.

6. The system of claim 5 wherein said first converter is adapted to selectively produce either an NTSC or an ASCII video signal.

7. The system of claim 1 wherein said second converter is adapted to generate an audio signal using voice synthesis.

8. The system of claim 1 further including a database which associates the telephone caller identification information with the identities of persons associated with those telephone numbers.

9. The system of claim 1 wherein said first converter is selectively adapted to produce either a message box or an overlay containing the caller identification information.

10. The system of claim 1 wherein said second converter is adapted to selectively produce either a muting or a volume reduction of the audio associated with a audio receiver.

11. A method for providing a caller identification notification comprising:
    providing a graphical user interface;
    allowing a user to selectively select between an audible and a video notification of the identity of an incoming telephone call by making a selection on said graphical user interface;
    receiving a caller identity delivery signal;
    receiving a user selection of either an audible or visual notification through said graphical user interface; and
    selectively converting said signal into an audible or visual notification based on the user's selection.

12. The method of claim 11 including prompting the user to select either an NTSC or ASCII video format.

13. The method of claim 11 including prompting the user to select a voice synthesis audio notification of caller identity information.

14. The method of claim 11 including generating a database containing information associating telephone numbers with frequent telephone callers.

15. The method of claim 11 including allowing the user to select between a message box or overlay display of caller identity information.

* * * * *